United States Patent
Suzuki et al.

(10) Patent No.: US 10,977,942 B2
(45) Date of Patent: Apr. 13, 2021

(54) DRIVING ASSISTANCE DEVICE AND DRIVING ASSISTANCE PROGRAM PRODUCT

(71) Applicant: DENSO CORPORATION, Kariya (JP)

(72) Inventors: Takamitsu Suzuki, Kariya (JP); Hiroshi Imajo, Kariya (JP); Masayuki Kondo, Kariya (JP); Tetsuro Koga, Kariya (JP); Erika Sawada, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/089,142

(22) PCT Filed: Jan. 25, 2017

(86) PCT No.: PCT/JP2017/002510
§ 371 (c)(1),
(2) Date: Sep. 27, 2018

(87) PCT Pub. No.: WO2017/169031
PCT Pub. Date: Oct. 5, 2017

(65) Prior Publication Data
US 2020/0302792 A1    Sep. 24, 2020

(30) Foreign Application Priority Data

Apr. 1, 2016 (JP) .............................. JP2016-074379
Nov. 8, 2016 (JP) .............................. JP2016-218085

(51) Int. Cl.
*G08G 1/16* (2006.01)
*G06K 9/00* (2006.01)

(52) U.S. Cl.
CPC ........... *G08G 1/16* (2013.01); *G06K 9/00805* (2013.01); *G06K 9/00845* (2013.01)

(58) Field of Classification Search
CPC .. G08G 1/16; G06K 9/00805; G06K 9/00845; B60W 30/0956; B60Q 1/525;
(Continued)

(56) References Cited

U.S. PATENT DOCUMENTS

| 9,248,796 | B2 * | 2/2016 | Takahashi | ............. B60W 50/14 |
| 2004/0150514 | A1 * | 8/2004 | Newman | ................ G08G 1/166 340/435 |

(Continued)

FOREIGN PATENT DOCUMENTS

| JP | H10221094 A | 8/1998 |
| JP | 2002163778 A | 6/2002 |

(Continued)

*Primary Examiner* — Emily C Terrell
(74) *Attorney, Agent, or Firm* — Harness, Dickey & Pierce, P.L.C.

(57) ABSTRACT

A driving assistance device: acquires presentation target information; controls a presentation of the presentation target information; calculates a recognition requisite time which is required for a driver to recognize the presentation target information when the presentation target information is presented; calculates a degree of risk which endangers a safety of the driver; calculates a given driving time according to the degree of risk which endangers the safety of the driver; and calculates a safe driving requisite time, which is a time required for the driver to drive safely, according to the degree of risk which endangers the safety of the driver. In a non-presented state of the presentation target information, when the given driving time becomes longer than a sum of the safe driving requisite time and the recognition requisite time, the driving assistance device presents the presentation target information.

11 Claims, 10 Drawing Sheets

(58) Field of Classification Search
CPC .. B60Q 1/50; B60Q 1/52; B60Q 9/008; B60R 21/0134; A61B 5/18
USPC ........................................................ 340/576
See application file for complete search history.

(56) References Cited

U.S. PATENT DOCUMENTS

2005/0030184 A1* 2/2005 Victor .................... B60K 28/06
340/576
2020/0122745 A1* 4/2020 Tivesten ............. B60W 50/085

FOREIGN PATENT DOCUMENTS

| JP | 2006231963 A | 9/2006 |
| JP | 2011248855 A | 12/2011 |
| JP | 2012198052 A | 10/2012 |

* cited by examiner $t1 \leq t2 + t3$
→PRESENTATION TARGET INFORMATION IS NOT PRESENTED t1 > t2 + t3
→PRESENTATION TARGET INFORMATION IS PRESENTED t1 ≤ t2+t3
t1 > t2+t5
→PRESENTATION TARGET INFORMATION IN PRESENTED STATE IS NOT ERASED $t1 \leq t2 + t5$

→PRESENTATION TARGET INFORMATION IN PRESENTED STATE IS ERASED

DRIVING ASSISTANCE DEVICE AND DRIVING ASSISTANCE PROGRAM PRODUCT

CROSS REFERENCE TO RELATED APPLICATIONS

This application is a U.S. National Phase Application under 35 U.S.C. 371 of International Application No. PCT/JP2017/002510 filed on Jan. 25, 2017. This application is based on and claims the benefit of priority from Japanese Patent Application No. 2016-074379 filed on Apr. 1, 2016 and Japanese Patent Application No. 2016-218085 filed on Nov. 8, 2016. The entire disclosures of all of the above applications are incorporated herein by reference.

TECHNICAL FIELD

The present disclosure relates to a driving assistance device and to a driving assistance program product.

BACKGROUND ART

It is crucial for safety that a driver's line of sight is directed to a road in a vehicle moving direction while driving. However, even when the driver is driving, the driver may be tempted to browse information (for example, news information or radio channel information) which is not directly related to a driving operation to be taken. In view of such concerns, it is normal to determine whether a vehicle is moving or not moving, and information is presented without any limitation when the vehicle is not moving whereas information is presented with limitation when the vehicle is moving. According to a configuration proposed to present information with limitation (see, for example, Patent Literatures 1 and 2), the limitation is relaxed or an information presentation method is changed by determining a level of psychological readiness of the driver when making an operation other than a driving operation.

PRIOR ART LITERATURES

Patent Literatures

Patent Literature 1: JP H10-221094 A
Patent Literature 2: JP 2012-198052 A

SUMMARY OF INVENTION

Both of the above configurations are effective in simply widening a range of information presented to the driver while the vehicle is moving. However, neither considers a recognition time required for the driver to recognize presented information. When a condition is made simpler with more emphasis on safety, a range of information which is otherwise to be presented intact to the driver may be narrowed and narrowing a range of information as above raises a risk of endangering safety of the driver.

In view of the foregoing difficulties, it is an object of the present disclosure to provide a driving assistance device and a driving assistance program product capable of appropriately assisting a driver in driving operation by widening a range of information presented to a driver while a vehicle is moving without endangering safety of a driver.

According to an aspect of the present disclosure: an information acquisition portion configured to acquire presentation target information; a presentation control portion configured to control a presentation of the presentation target information; a recognition requisite time calculation portion configured to calculate a recognition requisite time which is required for a driver to recognize the presentation target information when the presentation target information is presented; a risk degree calculation portion configured to calculate a degree of risk which endangers a safety of the driver; a given driving time calculation portion configured to calculate a given driving time according to the degree of risk which endangers the safety of the driver, the given driving time being a time given to the driver; and a safe driving requisite time calculation portion configured to calculate a safe driving requisite time, which is a time required for the driver to drive safely, according to the degree of risk which endangers the safety of the driver. In a non-presented state of the presentation target information, when the given driving time becomes longer than a sum of the safe driving requisite time and the recognition requisite time, the presentation control portion presents the presentation target information.

The presentation target information is presented under a condition that the given driving time is longer than a sum of the safe driving requisite time and the recognition requisite time, that is, it is a circumstance where the driver is able to recognize the presentation target information when the presentation target information is presented. Hence, the presentation target information can be presented in consideration of a recognition time required for the driver to recognize the presented information. Owing to the configuration as above, a range of information presented to the driver can be widened without endangering safety of the driver. Hence, the present disclosure is capable of appropriately assisting a driver in driving operation.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
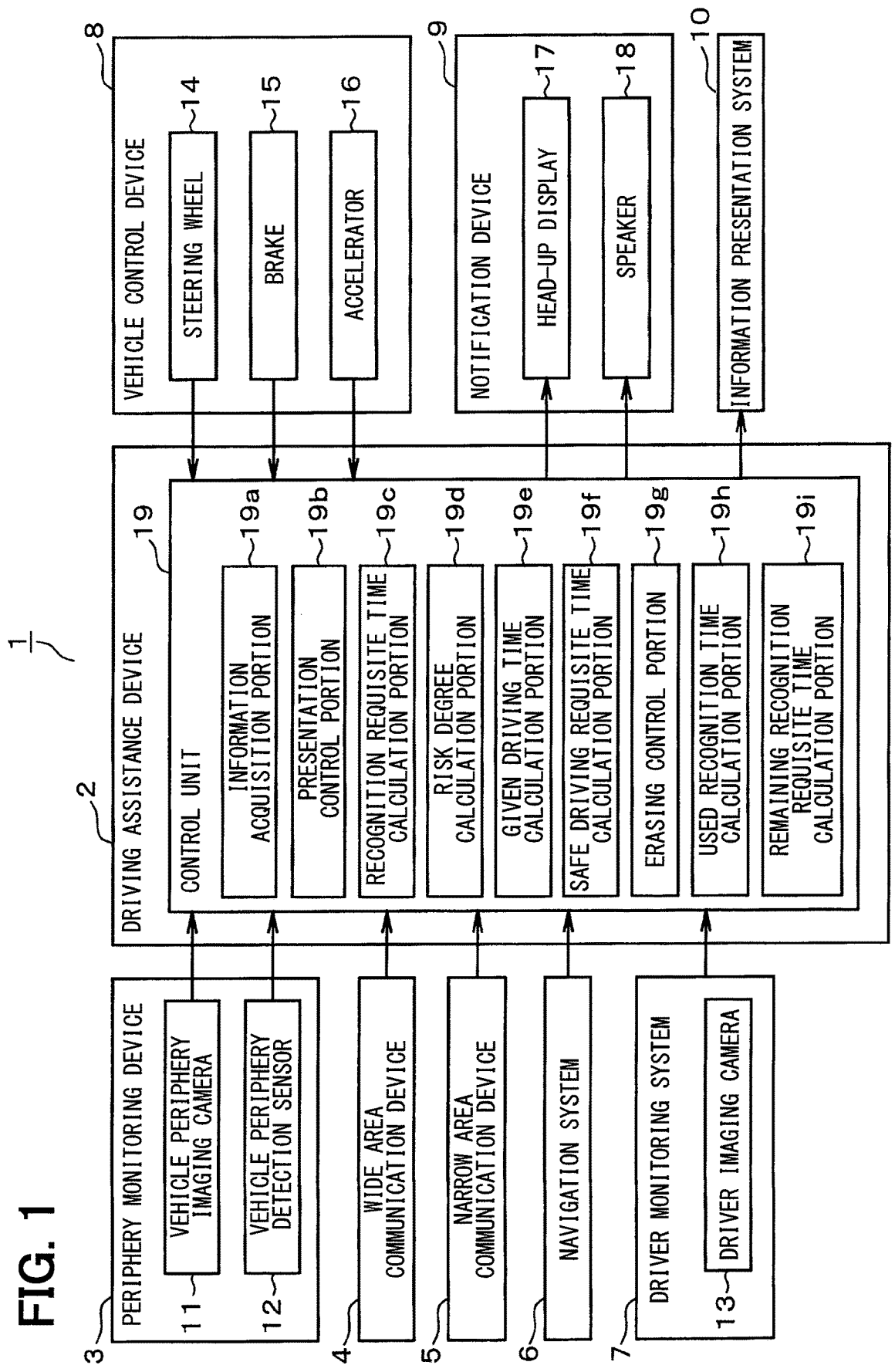
FIG. 1 is a functional block diagram of one embodiment.
Figure 2:
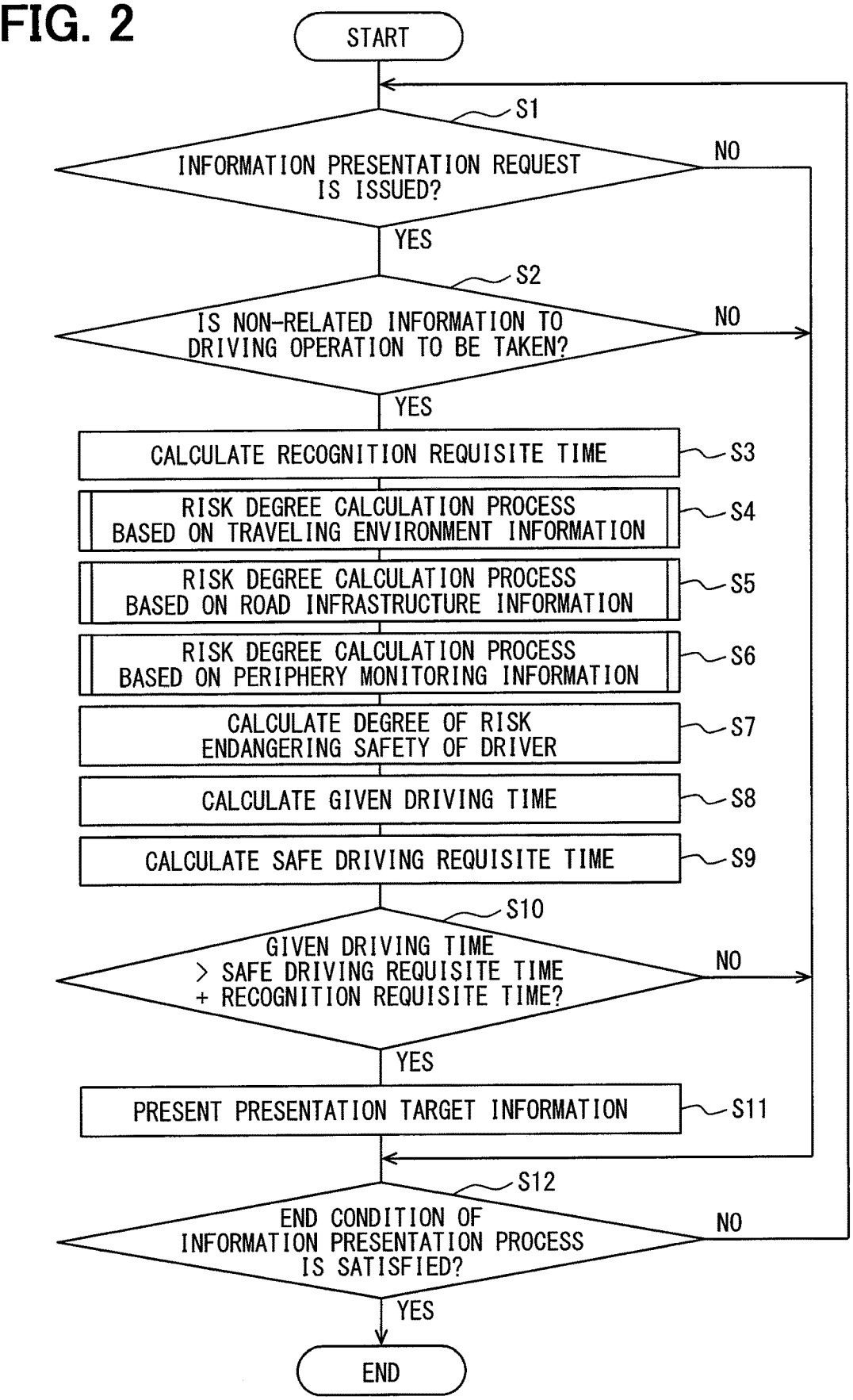
FIG. 2 shows a flowchart depicting processing performed by a control unit.
Figure 3:
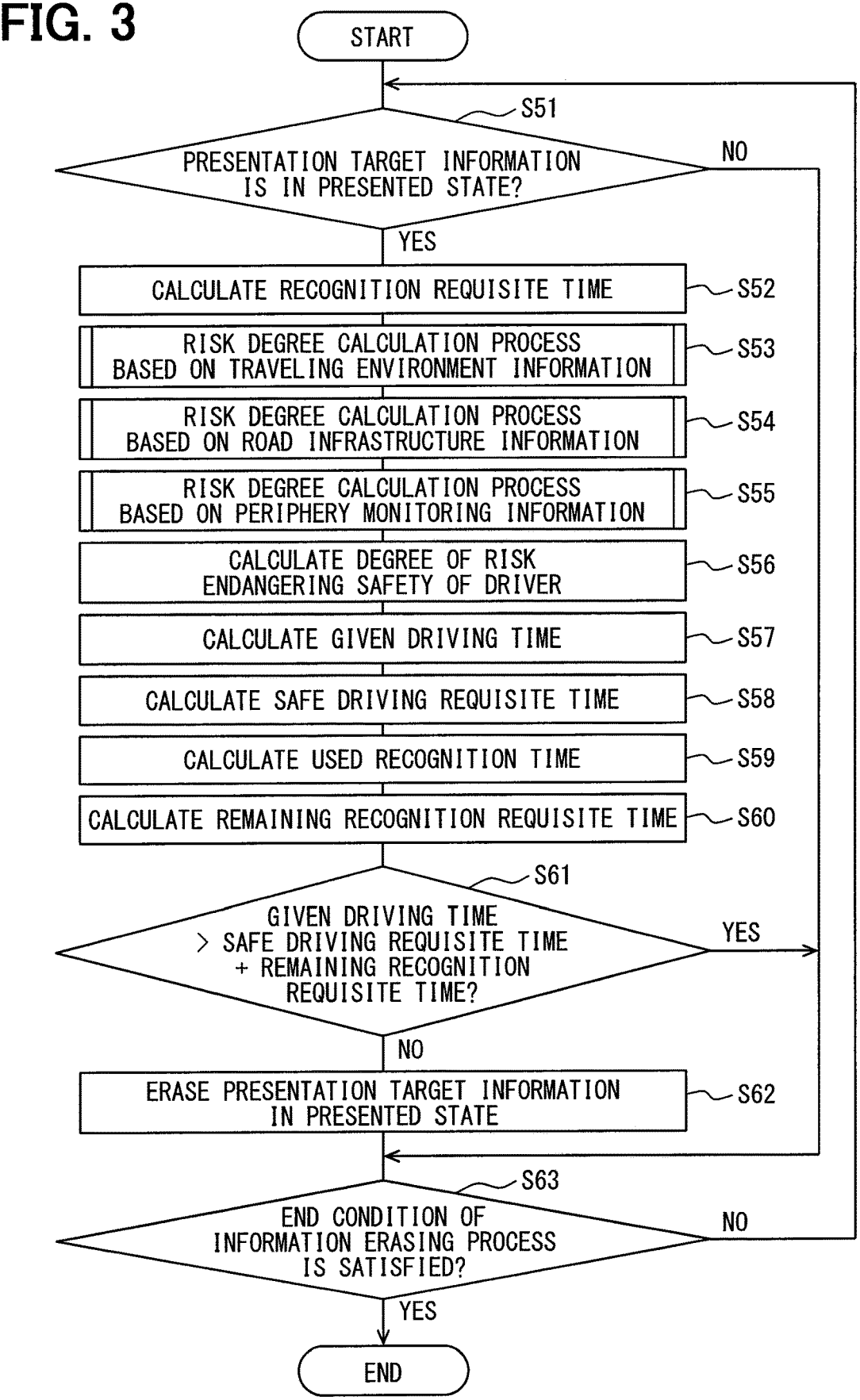
FIG. 3 shows a flowchart depicting another process performed by the control unit.
Figure 4:
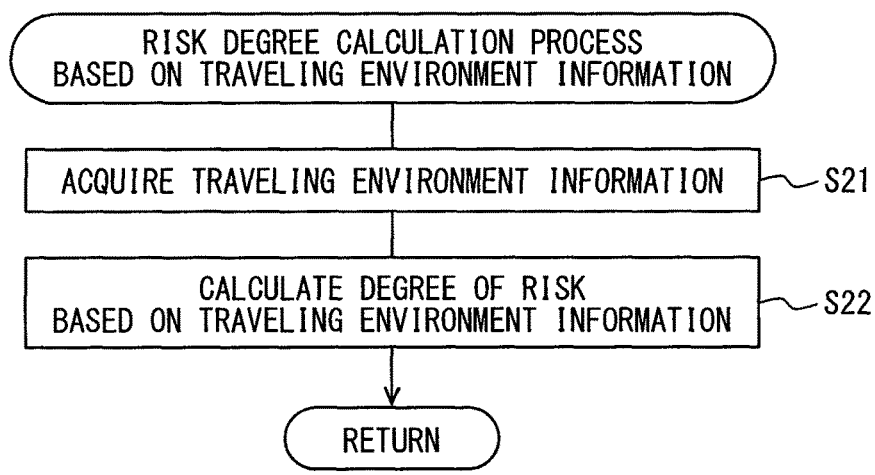
FIG. 4 shows a sub-routine of the process performed by the control unit.
Figure 5:
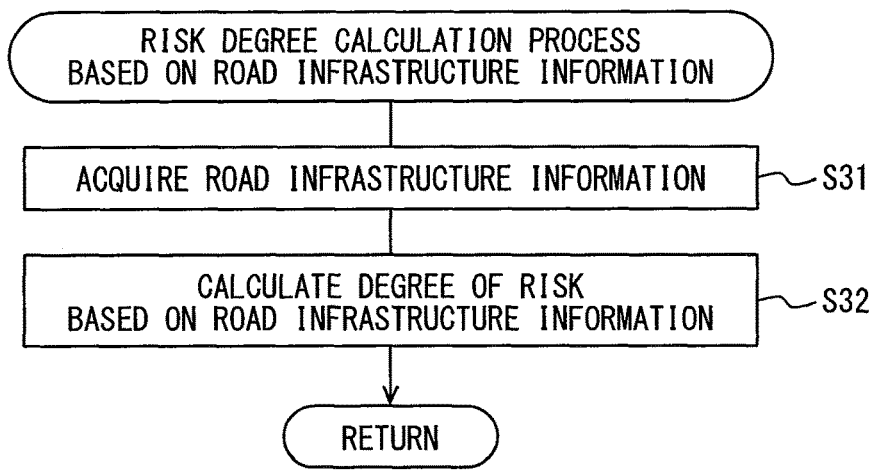
FIG. 5 shows another sub-routine of the process performed by the control unit.
Figure 6:
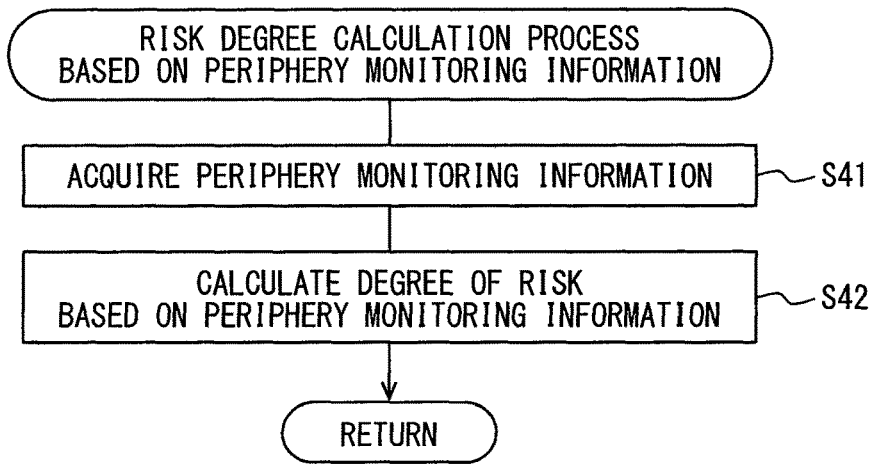
FIG. 6 shows still another sub-routine of the process performed by the control unit.

Hereinafter, one embodiment will be described with reference to the drawings. A driving assistance system 1 includes a driving assistance device 2, a periphery monitoring device 3, a wide area communication device 4, a narrow area communication device 5, a navigation system 6, a driver monitoring system 7, a vehicle control device 8, a notification device 9, and an information presentation system 10.

The periphery monitoring device 3 includes a vehicle periphery imaging camera 11 capturing images of a periphery of a vehicle, and a vehicle periphery detection sensor 12 detecting an obstacle existing in the periphery of the vehicle (for example, another vehicle existing ahead of own vehicle or a pedestrian). The vehicle periphery imaging camera 11 captures images of the periphery of the vehicle, detects the periphery of the vehicle by using the captured images, and outputs a detection signal containing a detection result to the driving assistance device 2. The vehicle periphery imaging camera 11 may be provided by a CCD (Charge Coupled Device) imaging sensor, a CMOS (Complementary Metal Oxide Semiconductor) imaging sensor, or the like. One or more than one vehicle periphery imaging camera 11 may be provided to the vehicle. The vehicle periphery detection sensor 12 detects the periphery of the vehicle and outputs a detection signal containing a detection result to the driving assistance device 2. The vehicle periphery detection sensor 12 may be provided by an ultrasonic sensor, a LADAR (Laser Detection and Ranging), a LIDAR (Light Detection and Ranging), or the like. One or more than one vehicle periphery detection sensor 12 may be provided.

The wide area communication device 4 performs wide area communication with various servers, and outputs an information signal containing various types of information acquired from the respective servers to the driving assistance device 2. The various servers include, for example, a server from which news information is distributed. The narrow area communication device 5 performs narrow area communication with an on-road communication device installed to a road or a vehicle-mounted communication device equipped to another vehicle, and outputs an information signal containing various types of information acquired from the on-road communication device or the vehicle-mounted communication device to the driving assistance device 2.

The navigation system 6 is furnished with navigation related functions, such as a function of identifying a present location of the vehicle, a function of identifying a type of a road the vehicle is traveling and a location of an intersection on the road, and a function of identifying a distance from the present location of the vehicle to the location of the intersection, and outputs a navigation signal containing navigation information to the driving assistance device 2. The driver monitoring system 7 includes a driver imaging camera 13 capturing an image of an upper half of the driver seated on a driver's seat. The driver monitoring system 7 detects a direction of a driver's line of sight by analyzing movements of a head and eyeballs of the driver using the image captured by the driver imaging camera 13, and outputs a detection signal indicating a detection result to the driving assistance device 2. The driver imaging camera 13 may be provided by a CCD imaging sensor, a CMOS imaging sensor, or the like. One or more than one driver imaging camera 13 may be provided to the vehicle.

The vehicle control device 8 includes a steering wheel 14, a brake 15, and an accelerator 16. The steering wheel 14 detects a steering angle when the driver makes a steering operation and outputs a detection signal indicating a detection result to the driving assistance device 2. The brake 15 detects a depression amount of a braking pedal when the driver makes a braking operation and outputs a detection signal indicating a detection result to the driving assistance device 2. The accelerator 16 detects a depression amount of an accelerator pedal when the driver makes an acceleration operation and outputs a detection signal indicating a detection result to the driving assistance device 2.

The notification device 9 includes a head-up display 17 and a speaker 18. When a display command signal is inputted from the driving assistance device 2, the head-up display 17 displays display information by projecting the display information onto a windshield. When an audio output command signal is inputted from the driving assistance device 2, the speaker 18 outputs audio information. The information presentation system 10 is a display unit provided by, for example, a liquid crystal display, and attached to a position easy to be seen from the driver during the driving operation. When a presentation command signal is inputted from the driving assistance device 2 while presentation target information is not presented, the information presentation system 10 presents (displays) the presentation target information. When an erasing command signal is inputted from the driving assistance device 2 while the presentation target information is in presented state, the information presentation system 10 erases the presentation target information being presented.

The driving assistance device 2 includes a control unit 19. The control unit 19 is provided by a microcomputer having a CPU (Central Processing Unit), a ROM (Read Only Memory), a RAM (Random Access Memory), and an I-O (Input and Output). By executing a computer program stored in a non-transitory tangible recording medium, the control unit 19 performs processes according to the program and controls an overall operation of the driving assistance device 2. The computer program executed by the control unit 19 includes a driving assistance program.

The control unit 19 includes an information acquisition portion 19a, a presentation control portion 19b, a recognition requisite time calculation portion 19c, a risk degree calculation portion 19d, a given driving time calculation portion 19e, a safe driving requisite time calculation portion 19f, an erasing control portion 19g, a used recognition time calculation portion 19h, and a remaining recognition requisite time calculation portion 19i. The respective portions 19a through 19i are achieved by the computer program executed by the control unit 19 in software manner.

The information acquisition portion 19a acquires the presentation target information. More specifically, in a case where wide area communication is performed between, for example, the wide area communication unit 4 and the server from which news information is distributed, the information acquisition portion 19a acquires the news information as the presentation target information. The presentation control portion 19b controls presentation of the presentation target information by controlling an output of a presentation command signal to the information presentation system 10.

The recognition requisite time calculation portion 19c calculates a recognition requisite time, which is a time required for the driver to recognize the presentation target information when the presentation target information is presented. That is, when a volume (the number of characters) of the presentation target information is relatively small, it is anticipated that it takes the driver a relatively short time to understand the presentation target information after the driver visually confirms the presentation target information. Hence, the recognition requisite time calculation portion 19c calculates a relatively short time as the recognition requisite time. On the contrary, when a volume of the presentation target information is relatively large, it is anticipated that it takes the driver a relatively long time to understand the presentation target information after the driver visually confirms the presentation target information. Hence, the recognition requisite time calculation portion 19c calculates a relatively long time as the recognition requisite time. In a case where the presentation target information is, for example, character information, a time required for the driver to recognize the character information may depend not only on whether the number of characters is simply large or small, but also on units of words and sentences. Hence, the recognition requisite time calculation portion 19c may calculate the recognition requisite time by comprehensively evaluating such dependencies.

The risk degree calculation portion 19d calculates a degree of risk endangering safety of the driver. More specifically, the risk degree calculation portion 19d calculates a degree of risk based on each of traveling environment information, road infrastructure information, and periphery monitoring information, then calculates a degree of risk endangering safety of the driver by comprehensively evaluating the calculated degrees of risks. A degree of risk is a measure of possibilities, for example, whether a front vehicle travelling ahead of the own vehicle, a pedestrian, or the like becomes an obstacle to a driving operation of the driver and whether a vehicle the driver is driving (own vehicle) collides with a front vehicle, a pedestrian, or the like which becomes an obstacle.

Traveling environment information is information relating to a traveling environment of the vehicle. The risk degree calculation portion 19d calculates a degree of risk based on the traveling environment information according to a traffic volume around the vehicle, a direction of the driver's line of sight, a driving operation state, and so on by using, for example, an information signal inputted from the wide area communication device 4, an information signal inputted from the narrow area communication device 5, a detection signal inputted from the driver monitoring system 7, and detection signals inputted from each of the steering wheel 14, the brake 15, and the accelerator 16. For example, when the driver's line of sight is directed from side to side relatively less frequently and the steering wheel 14 is operated relatively less frequently, it is determined that the vehicle is traveling on a straight road. In this case, the risk degree calculation portion 19d calculates a relatively small value as a value representing a degree of risk based on the traveling environment information. For example, when the driver's line of sight moves from side to side relatively frequently and the steering wheel 14 is operated relatively frequently, it is determined that the vehicle is traveling on a curvy road. In this case the risk degree calculation portion 19d calculates a relatively large value as a value representing a degree of risk based on the traveling environment information.

Road infrastructure information is information related to an infrastructure of a road on which the vehicle is traveling. The risk degree calculation portion 19d calculates a degree of risk based on the road infrastructure information according to a type of the road the vehicle is traveling, presence or absence of intersections, and so on by using, for example, a navigation signal inputted from the navigation system 6, an information signal inputted from the wide area communication device 4, and an information signal inputted from the narrow area communication device 5. When it is determined that, for example, the vehicle is traveling on a car-only road where entry of a pedestrian is forbidden, the risk degree calculation portion 19d calculates a relatively small value as a value representing a degree of risk based on the road infrastructure information. Meanwhile, when it is determined that, for example, the vehicle is traveling on an ordinary road or a narrow street with relatively large number of pedestrians, the risk degree calculation portion 19d calculates a relatively large value as a value representing a degree of risk based on the road infrastructure information.

Periphery monitoring information is information related to monitoring result of the periphery of the vehicle. The risk degree calculation portion 19d calculates a degree of risk based on the periphery monitoring information according to presence or absence of an obstacle on the periphery of the vehicle and the like by using, for example, a detection signal inputted from the vehicle peripheral imaging camera 11, and a detection signal inputted from the vehicle periphery detection sensor 12. When it is determined that, for example, relatively a small number of vehicles or pedestrians are present on the periphery of the vehicle, the risk degree calculation portion 19d calculates a relatively small value as a value representing a degree of risk based on the periphery monitoring information. Meanwhile, when it is determined that, for example, relatively a large number of vehicles and pedestrians are present on the periphery of the vehicle, the risk degree calculation portion 19d calculates a relatively large value as a value representing a degree of risk based on the periphery monitoring information.

The risk degree calculation portion 19d calculates a degree of risk by using not only a detection signal and a navigation signal inputted, respectively, from the periphery monitoring device 3 and the navigation system 6 equipped to the vehicle, but also information signals inputted from the wide area communication device 4 and the narrow area communication device 5 performing communication with equipment outside the vehicle, such as various servers, on-road communication devices, and vehicle-mounted communication devices on any other vehicle. That is, the risk degree calculation portion 19d is capable of calculating a degree of risk from multiple aspects by using not only information generated inside the vehicle, but also information generated outside of the vehicle.

A possibility of crossing of a traffic line, which may cause a collision with an obstacle on the periphery of the vehicle, will now be described. While the vehicle is traveling on a car-only road, crossing of a traffic line occurs only when traffic merges or the driver changes lanes on the road the vehicle is traveling, and an obstacle is limited to another vehicle, a motor bicycle, or the like. On the contrary, while the vehicle is traveling on an ordinary road, crossing of a traffic line occurs not only at an intersection and when the driver changes lanes on the road the vehicle is traveling, but also when an individual or an object darts out into the road the vehicle is traveling, and an obstacle is not limited to another vehicle or a motor bicycle and includes a pedestrian and a bicycle. By calculating a degree of risk based on the road infrastructure information, a difference between a degree of risk anticipated on a car-only road and a degree of risk anticipated on an ordinary road can be eliminated. Hence, the risk degree calculation portion 19d becomes capable of calculating a degree of risk at a higher degree of accuracy.

The given driving time calculation portion 19e calculates, according to a degree of risk calculated by the risk degree calculation portion 19d, a given driving time which is a time given to the driver. More specifically, in a case where another vehicle is traveling ahead of the own vehicle, the given driving time calculation portion 19e calculates the given driving time in accordance with a calculating formula as follows:

Given driving time=distance between own vehicle and front vehicle÷relative speed of own vehicle with respect to front vehicle.

In a case where a fallen object is present ahead of the own vehicle, a moving speed of the fallen object is 0 and a relative speed of the own vehicle with respect to the fallen object is equal to a speed of the own vehicle. Hence, the given driving time calculation portion 19e calculates the given driving time in accordance with a calculating formula as follows:

Given driving time=distance from own vehicle to fallen object÷speed of own vehicle.

The calculating formulae above are formulated on an assumption that the own vehicle is traveling on a straight road at a constant speed. In a case where the own vehicle is traveling on a curved road, the given driving time calculation portion 19e may calculate the given driving time in consideration of an increase and a decrease in distance corresponding to a predicted traveling route or in consideration of acceleration and deceleration corresponding to an increase or decrease of the relative speed.

The safe driving requisite time calculation portion 19f calculates a safe driving requisite time, which is a time required for the driver to drive safely, according to a degree of risk calculated by the risk degree calculation portion 19d. The safe driving requisite time calculation portion 19f calculates, for example, a predicted collision time (a time left before the own vehicle collides with a vehicle or an obstacle ahead assuming a relative speed is constant) as the safe driving requisite time.

More specifically, in a case where another vehicle is traveling ahead of the own vehicle, the given driving time calculation portion 19e calculates the given driving time in accordance with a procedure described below. Basically, the driver controls the own vehicle by an acceleration action, a turning action, and a stopping action. The driver is able to accelerate the own vehicle by performing an acceleration operation, turn the own vehicle by performing a steering operation, and stop the own vehicle by performing a braking operation. On the basis of the understanding as above, the given driving time calculation portion 19e determines whether the driver is able to change lanes by a steering operation or decelerate by a braking operation as an action that can be taken by the driver to avoid a collision of the own vehicle with front vehicle.

Firstly, the given driving time calculation portion 19e determines whether a space large enough for the own vehicle to fit in is present on a lateral side of the front vehicle and whether the driver is able to change lanes by a steering operation. For example, in a case where the front vehicle is traveling in a center lane of a three-lane road, the given driving time calculation portion 19e determines whether a vehicle is traveling in a left lane and a right lane of the front vehicle. In a case where no vehicle is traveling in any one of the right or left lanes of the front vehicle, the given driving time calculation portion 19e determines that the driver is able to change lanes by performing a steering operation. Meanwhile, in a case where a vehicle is traveling in each of the right and left lanes of the front vehicle, the given driving time calculation portion 19e determines that the driver is unable to change lanes by a steering operation. When it is determined that the driver is able to change lanes by a steering operation, the given driving time calculation portion 19e calculates a rotation angle that can be produced by a safe steering operation according to an angle at or below which drifting does not occur, a maximum turning angle produced by a past steering operation made appropriately corresponding to a vehicle speed by a driver of the front vehicle, or the like. The given driving time calculation portion 19e calculates an avoiding action performance distance, which is a distance that allows the driver to drive the own vehicle into one of the left or right lanes of the front vehicle, according to the calculated rotation angle that can be produced by a safe steering operation, and calculates an avoiding action performance time in accordance with a calculating formula as follows:

Avoiding action performance time=avoiding action performance distance÷relative speed of own vehicle with respect to front vehicle.

Subsequently, the given driving time calculation portion 19e calculates a time taken until a relative speed of the own vehicle with respect to the front vehicle decreases to 0. The given driving time calculation portion 19e calculates a frictional coefficient which can be induced by a safe braking operation according to a depression amount at or below which slipping is prevented or a depression amount of a past braking operation made appropriately corresponding to a vehicle speed by the driver of the front vehicle, and calculates a deceleration requisite time in accordance with a calculating formula as below by using the calculated frictional coefficient and a present relative speed of the own vehicle with respect to the front vehicle:

Deceleration requisite time=relative speed of own vehicle with respect to front vehicle÷(gravitational acceleration×frictional coefficient).

The given driving time calculation portion 19e makes a comparison between the avoiding action performance time and the deceleration requisite time calculated in the manner as above, and calculates the safe driving requisite time by adding a reaction time of the driver (idle running time) to one of the avoiding action performance time or the deceleration requisite time which is the shorter.

Meanwhile, when it is determined that the driver is unable to change lanes by a steering operation, the given driving time calculation portion 19e does not calculate the avoiding action performance time and calculates the deceleration requisite time in the manner as above. Subsequently, the given driving time calculation portion 19e calculates the safe driving requisite time by adding a reaction time to the calculated deceleration requisite time.

Although it will be described in detail below, the presentation control portion 19b determines whether to present the presentation target information according to the recognition requisite time, the given driving time, and the safe driving requisite time.

The erasing control portion 19g controls erasing of the presentation target information which is in presented state by controlling an output of an erasing command signal to the information presentation system 10. The used recognition time calculation portion 19h calculates a used recognition time, which is a time used by the driver to recognize the presentation target information. The phrase, "for the driver to recognize the presentation target information", referred to herein means a time used by the driver to direct the line of sight to the presentation target information which is controlled to be presented by the information presentation system 10 and to read the presentation target information. The used recognition time calculation portion 19h calculates a time during which the driver is looking at the presentation target information being presented by the information presentation system 10 as the used recognition time according to a detection result of movements of eyeballs of the driver detected by the driver monitoring system 7. The remaining recognition requisite time calculation portion 19*i* calculates a remaining recognition requisite time, which is a time found by subtracting the used recognition time from the recognition requisite time. Although it will be described in detail below, the erasing control portion 19*g* determines whether to erase the presentation target information being presented according to the given driving time, the safe driving requisite time, and the remaining recognition requisite time.

The following will describe a function of the configuration above with reference to FIG. 2 through FIG. 12.

The control unit 19 performs information presentation process and information erasing process, each of which will be described in the following.

(1) Information Presentation Process

The control unit 19 starts the information presentation process when a start condition of the information presentation process is satisfied, for example, when an ignition switch is switched ON from OFF. The control unit 19 may determine that the start condition of the information presentation process is satisfied also when, for example, a vehicle speed rises to and stays at or above a certain speed or the driver makes a predetermined operation in addition to ON-OFF switching of the ignition switch.

When the information presentation process starts, the control unit 19 determines whether an information presentation request is issued by using the information acquisition portion 19*a* (S1). In a case where it is determined that an information presentation request is issued (S1: YES), the control unit 19 determines whether information corresponding to the information presentation request is non-related information to a driving operation to be taken (S2). Herein, non-related information to the driving operation to be taken is information which is not directly related to the driving operation to be taken. For example, when news information distributed from a server is received at the wide area communication portion 4, the control unit 19 determines that the news information is non-related information to the driving operation to be taken.

In a case where it is determined that information corresponding to the information presentation request is non-related information to the driving operation to be taken (S2: YES), the control unit 19 handles the information corresponding to the information presentation request as presentation target information and calculates, as the recognition requisite time, a time required for the driver to recognize the presentation target information assuming that the presentation target information is presented by using the recognition requisite time calculation portion 19*c* (S3, corresponding to a recognition requisite time calculation step).

The control unit 19 performs risk degree calculation process based on the traveling environment information (S4), performs risk degree calculation process based on the road infrastructure information (S5), and performs risk degree calculation process based on the periphery monitoring information (S6), and calculates a degree of risk endangering safety of the driver by using the risk degree calculation portion 19*d* (S7, corresponding to a risk degree calculation step). That is, when the flow of the information presentation process proceeds to the risk degree calculation process based on the traveling environment information, the control unit 19 acquires the traveling environment information (S21) and calculates a degree of risk based on the traveling environment information according to the acquired traveling environment information (S22). The flow then returns to the information presentation process. When the flow of the information presentation process proceeds to the risk degree calculation process based on the road infrastructure information, the control unit 19 acquires the road infrastructure information (S31) and calculates a degree of risk based on the road infrastructure information according to the acquired road infrastructure information (S32). The flow then returns to the information presentation process. When the flow of the information presentation process proceeds to the risk degree calculation process based on the periphery monitoring information, the control unit 19 acquires the periphery monitoring information (S41) and calculates a degree of risk based on the periphery monitoring information according to the acquired periphery monitoring information (S42). The flow then returns to the information presentation process. In the manner as above, the control unit 19 calculates a degree of risk based on the traveling environment information, a degree of risk based on the road infrastructure information, and a degree of risk based on the periphery monitoring information and calculates a degree of risk endangering safety of the driver by comprehensively evaluating the calculated degrees of risk by using the risk degree calculation portion 19*d*.

The control unit 19 calculates a time given to the driver as the given driving time according to the calculated degree of risk endangering safety of the driver by using the given driving time calculation portion 19*e* (S8, corresponding to a given driving time calculation step). The control unit 19 calculates a time required for the driver to drive safely as the safe driving requisite time according to the calculated degree of risk endangering safety of the driver by using the safe driving requisite time calculation portion 19*f* (S9, corresponding to a safe driving requisite time calculation step).

After the recognition requisite time, the given driving time, the safe driving requisite time are calculated in the manner as above, the control unit 19 determines whether to present the presentation target information according to the calculated times by using the presentation control portion 19*b*. That is, the control portion 19 calculates a sum of the safe driving requisite time and the recognition requisite time and determines whether the given driving time is longer than a sum of the safe driving requisite time and the recognition requisite time (S10). When it is determined that the given driving time is longer than a sum of the safe driving requisite time and the recognition requisite time (S10: YES), the control unit 19 outputs a presentation command signal to the information presentation system 10 and controls the information system 10 to present the presentation target information (S11, corresponding to a presentation control step). Meanwhile, when it is determined that the given driving time is not longer than a sum of the safe driving requisite time and the recognition requisite time (S10: NO), the control unit 19 does not output a presentation command signal to the information presentation system 10 so that the information presentation system 10 does not present the presentation target information and continues a state in which the presentation target information is not presented (corresponding to a presentation control step).

The control unit 19 determines whether an end condition of the information presentation process is satisfied (S12). When it is determined that the end condition of the information presentation process is not satisfied (S12: NO), the flow returns to Step S1 to repeat Step S1 and the following steps. When it is determined that the end condition of the information presentation process is satisfied, for example, when the ignition switch is switched OFF from ON (S12: YES), the control unit 19 ends the information presentation process. The control unit 19 may determine that the end condition of the information presentation process is satisfied also when a vehicle speed decreases to a certain speed or below, or the driver makes a predetermined operation in addition to ON-OFF switching of the ignition switch.

Figure 7:
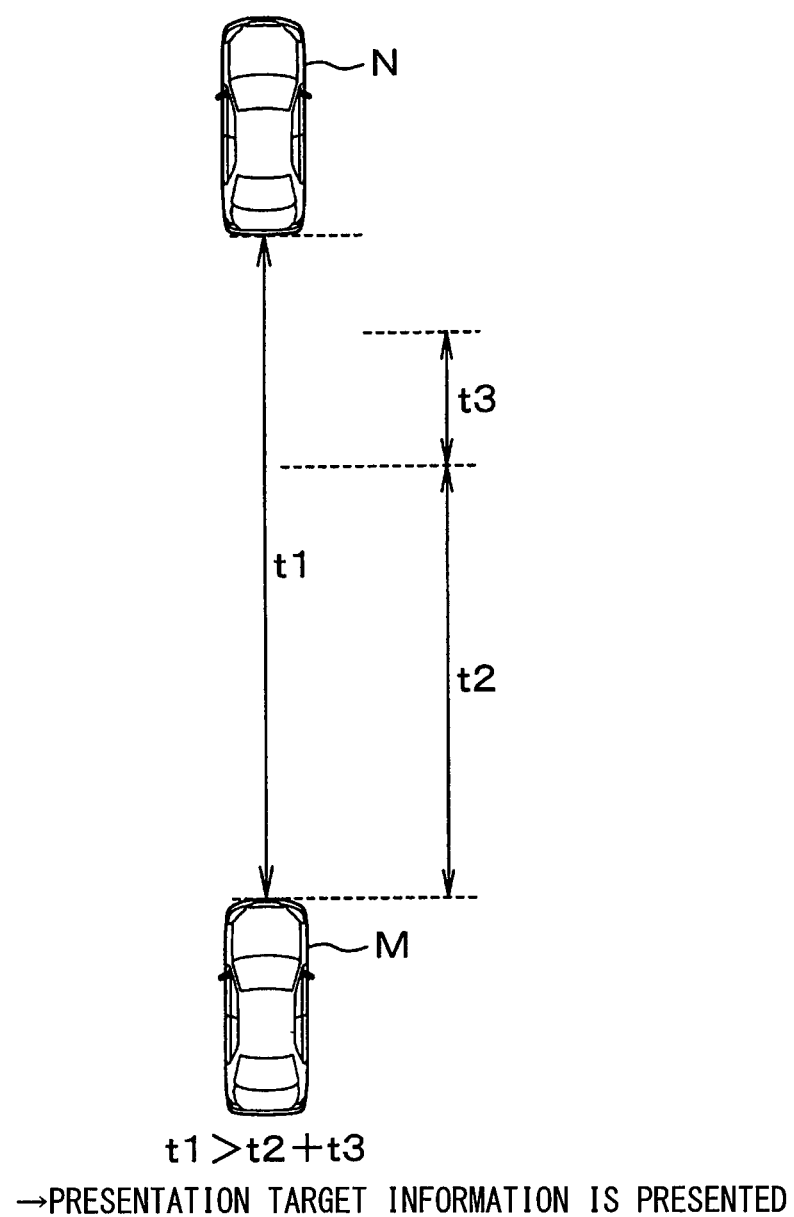
FIG. 7 is a diagram showing a relationship (first case) of respective times.
Figure 8:
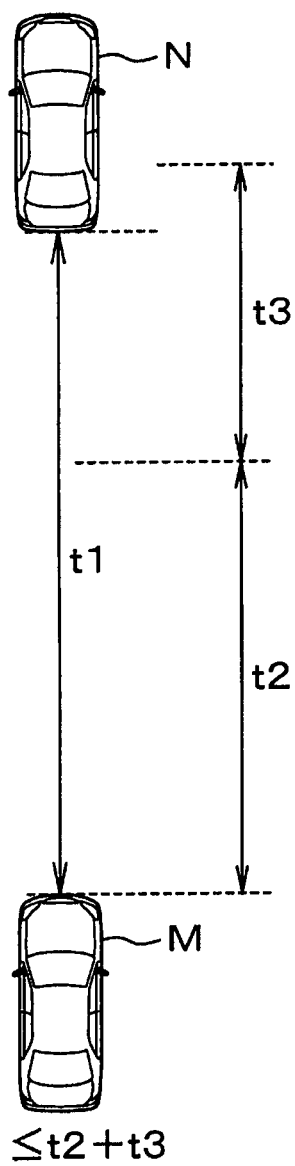
FIG. 8 is a diagram showing a relationship (second case) of respective times.
Figure 9:
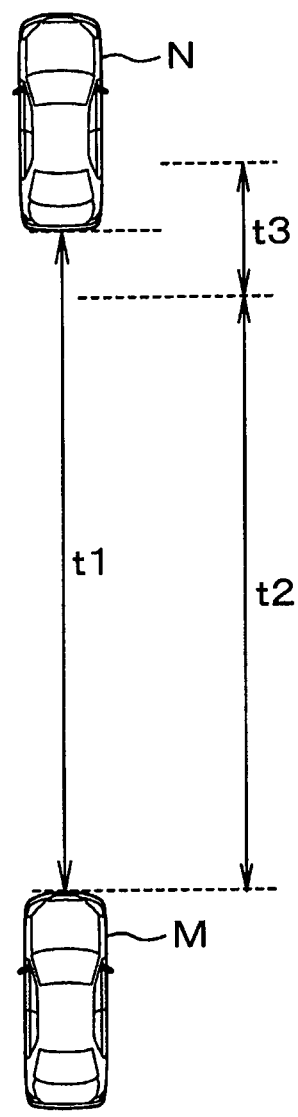
FIG. 9 is a diagram showing a relationship (third case) of respective times.

That is, as are shown in FIG. 7 through FIG. 9, define t1 as the given driving time, t2 as the safe driving requisite time, and t3 as the recognition requisite time. Then, as an example of FIG. 7, when a relationship expressed by an expression, t1>t2+t3, is established by a distance between the own vehicle M and a front vehicle N, a relative speed of the own vehicle M with respect to the front vehicle N, and so on, the control unit 19 presents the presentation target information. Meanwhile, as an example of FIG. 8 where the safe driving requisite time is same whereas the recognition requisite time is longer in comparison with the example of FIG. 7, when a relationship expressed by an expression, t1≤t2+t3, is established, the control unit 19 does not present the presentation target information. Likewise, as an example of FIG. 9 where the recognition requisite time is same whereas the safe driving requisite time is longer in comparison with the example of FIG. 7, when a relationship expressed by an expression, t1≤t2+t3, is established, the control unit 19 does not present the presentation target information.

(2) Information Erasing Process

When a start condition of the information erasing process is satisfied, for example, when the ignition switch is switched ON from OFF, the control unit 19 starts the information erasing process.

When the information erasing process starts, the control unit 19 determines whether the presentation target information is in presented state (S51). When it is determined that the presentation target information is in presented state (S51: YES), the control unit 19 calculates a time required for the driver to recognize the presentation target information in presented state as the recognition requisite time by using the recognition requisite time calculation portion 19c (S52, corresponding to the recognition requisite time calculation step). Alternatively, the control unit 19 may not calculate the recognition requisite time herein, and may instead use the recognition requisite time calculated in the information presentation process.

As in Steps S4 through S9 described above, the control unit 19 performs risk degree calculation process based on the traveling environment information (S53), performs risk degree calculation process based on the road infrastructure information (S54), and performs risk degree calculation process based on the periphery monitoring information (S55), and calculates a degree of risk endangering safety of the driver by comprehensively evaluating the calculated degrees of risk by using the risk degree calculation portion 19d (S56, corresponding to the risk degree calculation step). The control unit 19 calculates a time given to the driver as the given driving time according to the calculated degree of risk endangering safety of the driver by using the given driving time calculation portion 19e (S57, corresponding to the given driving time calculation step). The control unit 19 calculates a time required for the driver to drive safely as the safe driving requisite time by using the safe driving requisite time calculation portion 19f (S58, corresponding to a safe driving requisite time step).

The control unit 19 calculates a time used by the driver to recognize the presentation target information in presented state as the used recognition time by using the used recognition time calculation portion 19h (S59, corresponding to a used recognition time calculation step). The control unit 19 calculates a time obtained by subtracting the used recognition time from the recognition requisite time as the remaining recognition requisite time by using the remaining recognition requisite time calculation portion 19i (S60, corresponding to a remaining recognition requisite time calculation step).

After the given driving time, the safe driving requisite time, and the remaining recognition requisite time are calculated in the manner as above, the control unit 19 determines whether to erase the presentation target information in presented state according to the calculated times by using the erasing control portion 19g. That is, the control unit 19 calculates a sum of the safe driving requisite time and the remaining recognition requisite time and determines whether the given driving time is longer than a sum of the safe driving requisite time and the remaining recognition requisite time (S61). When it is determined that the given driving time is longer than a sum of the safe driving requisite time and the remaining recognition requisite time (S61: YES), the control unit 19 does not output an erasing command signal to the information presentation system 10 so that the information presentation system 10 does not erase the presentation target information in presented state and continues an operation to present the presentation target information (corresponding to a erasing control step). Meanwhile, when it is determined that the given driving time is not longer than a sum of the safe driving requisite time and the remaining recognition requisite time (S61: NO), the control unit 19 outputs an erasing command signal to the information presentation system 10 so that the information present system 10 erases the presentation target information in presented state (S62, corresponding to the erasing control step).

The control unit 19 determines whether an end condition of the erasing presentation process is satisfied (S63). When it is determined that the end condition of the information erasing process is not satisfied (S63: NO), the flow returns to Step S51 to repeat Step S51 and the following steps. When it is determined that the end condition of the information erasing process is satisfied (S63: YES), for example, when the ignition switch is switched OFF from ON, the control unit 19 ends the information erasing process.

Figure 10:
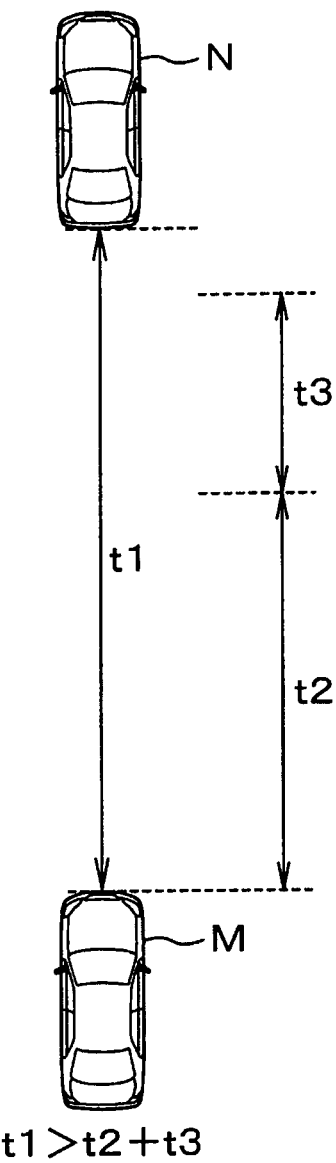
FIG. 10 is a diagram showing a relationship (fourth case) of respective times.
Figure 11:
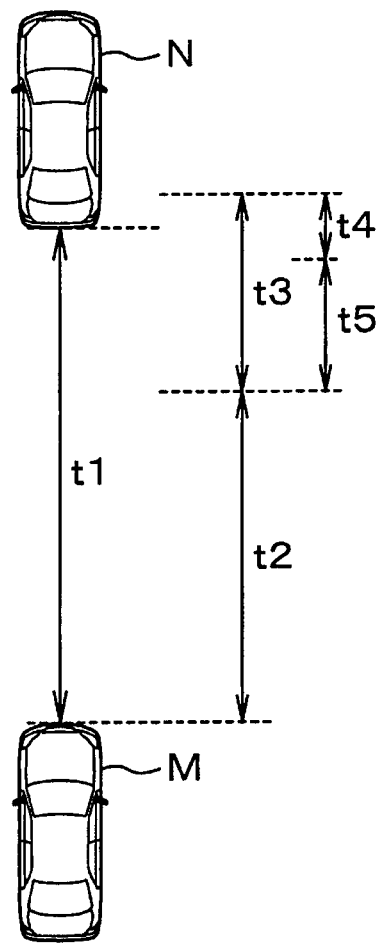
FIG. 11 is a diagram showing a relationship (fifth case) of respective times.
Figure 12:
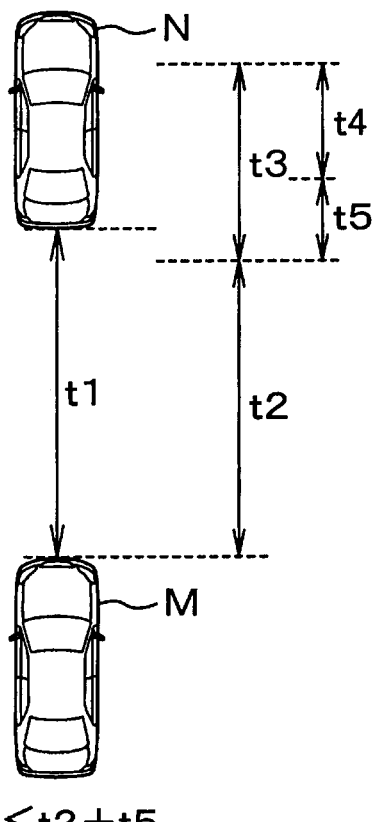
FIG. 12 is a diagram showing a relationship (sixth case) of respective times.

That is, as are shown in FIG. 10 through FIG. 12, define t1 as the given driving time, t2 as the safe driving requisite time, t3 as the recognition requisite time, t4 as the used recognition time, and t5 as the remaining recognition requisite time. Then, in an example of FIG. 10, when a relationship expressed by an expression, t1>t2+t3, is established by a distance between the own vehicle M and a front vehicle N, a relative speed of the own vehicle M with respect to the front vehicle N, and so on, the control unit 19 presents the presentation target information. When a distance between the own vehicle M and the front vehicle N and a relative speed of the own vehicle M with respect to the front vehicle N vary with time and a relationship expressed by an expression, t1≤t2+t3, is established as an example of FIG. 11. However, the control unit 19 does not erase the presentation target information in presented state when a relationship expressed by an expression, t1>t2+t5 is established at the same time. When a distance between the own vehicle M and the front vehicle N and a relative speed of the own vehicle M with respect to the front vehicle N vary further with time and a relationship expressed by an expression, t1≤t2+t5, is established as an example of FIG. 12, the control unit 19 erases the presentation target information in presented state.

As has been described, according to the present embodiment, effects as follows can be obtained.

The driving assistance device 2 presents the presentation target information under a condition that the given driving time is longer than a sum of the safe driving requisite time and the recognition requisite time, that is, it is a circumstance where the driver is able to recognize the presentation target information, for example, news information, when the presentation target information is presented. Owing to the configuration above, the presentation target information can be presented in consideration of a recognition time required for the driver to recognize the presentation target information to be presented. Hence, the driving assistance device 2 is capable of appropriately assisting a driver with driving operation by widening a range of information presented to the driver while securing safety of the driving operation.

The driving assistance device 2 is also capable of appropriately assisting a driver with driving operation in circumstances as follows. Besides the news information, information on a fallen object provided from VICS (registered trademark and standing for Vehicle Information and Communication System) or the like is classified as non-related information to the driving operation to be taken. However, in a case where the fallen object is present ahead of a road on which the own vehicle is traveling, the driver needs to know the presence of the fallen object in advance so that the driver is able to avoid the fallen object by recognizing the information in advance. Herein, the fallen object is a matter of relatively high urgency when a distance from the own vehicle to the fallen object is relatively short and it is necessary to present information on the fallen object quickly. On the contrary, the fallen object is a matter of relatively low urgency when a distance from the own vehicle to the fallen object is relatively long and it is not necessary to present information on the fallen object quickly. Suppose that a distance from the own vehicle to the fallen object is relatively long. In this case, when a risk of collision is arising from a relationship between the own vehicle and an obstacle on the periphery of the own vehicle, it is more crucial for the driver to recognize the relationship between the own vehicle and an obstacle on the periphery of the own vehicle than to recognize the presence of the fallen object.

In such a case, by presenting information on the fallen object only when a time the driver is allowed to spend in recognizing the presence of the fallen object is secured, the driver who is aware of the relationship between the own vehicle and an obstacle on the periphery of the own vehicle becomes able to recognize the presence of the fallen object. This configuration can avoid a situation where the driver is left unaware of the presence of the fallen object by not providing the information on the fallen object. That is, in a configuration which does not adopt the present embodiment, an ability of the driver is intensively used in recognizing the relationship between the own vehicle and an obstacle on the periphery of the own vehicle and the driver may fail to recognize the presence of the fallen object, or conversely an ability of the driver is intensively used in recognizing the presence of the fallen object and the driver may fail to recognize the relationship between the own vehicle and an obstacle on the periphery of the own vehicle. By contrast, according to the present embodiment which is configured to present the information on the fallen object when the own vehicle comes closer to the fallen object to an extent that the fallen object becomes a matter of high urgency, the driver who is aware of the relationship between the own vehicle and an obstacle on the periphery of the own vehicle becomes able to recognize the presence of the fallen object. Hence, the present embodiment is capable of appropriately assisting a driver with the driving operation.

The driving assistance device 2 does not present the presentation target information in a case where the given driving time is not longer than a sum of the safe driving requisite time and the recognition requisite time, that is, in a circumstance where the driver is unable to recognize the presentation target information even when the presentation target information is presented. Hence, the driver may feel less annoyed compared with a case where the presentation target information is erased right after the presentation target information is presented.

The driving assistance device 2 does not erase the presentation target information in presented state in a case where the given driving time is longer than a sum of the safe driving requisite time and the remaining recognition requisite time, that is, in a circumstance where the driver is able to recognize the presentation target information continuously. Hence, the driving assistance device 2 is capable of continuing an operation to present the presentation target information in consideration of the remaining recognition time required for the driver to recognize the presentation target information being presented.

The driving assistance device 2 erases the presentation target information in presented state in a case where the given driving time is not longer than a sum of the safe driving requisite time and the remaining recognition requisite time, that is, in a circumstance where the driver is unable to recognize the presentation target information even when the presentation of the presentation target information is continued. Owing to the configuration as above, an endangering of driver's safety caused by continuing an operation to present the presentation target information can be avoided. Hence, the driving assistance device 2 is capable of appropriately responding to an environmental factor which varies from time to time after the presentation target information is presented while adding hysteresis to an information presentation condition.

The driving assistance device 2 calculates a degree of risk endangering safety of the driver by calculating a degree of risk based on the traveling environment information, a degree of risk based on the road infrastructure information, and a degree of risk based on the periphery monitoring information. Hence, the driving assistance device 2 is capable of calculating a degree of risk more accurately by calculating a degree of risk endangering safety of the driver from multiple aspects.

While the disclosure has been described with reference to a preferred embodiment thereof, it is to be understood that the disclosure is not limited to the preferred embodiment and constructions. The disclosure is intended to cover various modification and equivalent arrangements. In addition, the various combinations and configurations, which are preferred, other combinations and configurations, including more, less or only a single element, are also within the spirit and scope of the disclosure.

The above has described a configuration in which a degree of risk endangering safety of the driver is calculated by calculating a degree of risk based on the traveling environment information, a degree of risk based on the road infrastructure information, and a degree of risk based on the periphery monitoring information as an example. However, it is not necessary to calculate a degree of risk based on three different factors, and it may be configured to calculate a degree of risk based on at least one factor.

A degree of risk based on the traveling environment information, a degree of risk based on the road infrastructure information, and a degree of risk based on the periphery monitoring information may be calculated by combining various signals inputted from outside the driving assistance device in various manners.

The above has described a configuration in which a time anticipated to be taken by the driver to understand the presentation target information after the driver visually confirms the presentation target information is calculated as the recognition requisite time. Alternatively, in a case where the presentation target information requires an operation of the driver or to change screens, a time required for an operation of the driver or to change screens may be added to the recognition requisite time. That is, in a case where information is presented in a hierarchical manner by an operation of the driver or by changing screens, the recognition requisite time becomes relatively long when the driver makes operations or screens are changed relatively many times.

The invention claimed is:

1. A driving assistance device comprising:
a controller having a processor, the controller configured to:
acquire presentation target information;
control a presentation of the presentation target information;
calculate a recognition requisite time, the recognition requisite time being a time required for a driver to recognize the presentation target information after the presentation target information is presented;
calculate a degree of risk, the degree of risk being a degree to which an obstacle detected by a vehicle periphery detection sensor endangers a safety of the driver;
calculate a given driving time according to the degree of risk, the given driving time being a time until contacting the obstacle; and
calculate a safe driving requisite time, the safe driving requisite time being a time required for the driver to drive safely based on the degree of risk, wherein
the presentation target information does not include information regarding the obstacle detected by the vehicle periphery detection sensor, and
in response to the presentation target information not being presented and the given driving time being longer than a sum of the safe driving requisite time and the recognition requisite time, the controller is further configured to present the presentation target information.

2. The driving assistance device according to claim 1, wherein:
in response to the presentation target information not being presented and the given driving time being equal to or shorter than the sum of the safe driving requisite time and the recognition requisite time, the controller is further configured to prohibit the presentation of the presentation target information.

3. The driving assistance device according to claim 1, wherein the controller is further configured to:
control an erasing of the presentation target information after the presentation of the presentation target information;
calculate a used recognition time, the used recognition time being a time actually used by the driver to recognize the presentation target information; and
calculate a remaining recognition requisite time, the remaining recognition requisite time being a difference of the recognition requisite time and the used recognition time, wherein
in response to the presentation target information being presented and the given driving time being longer than a sum of the safe driving requisite time and the remaining recognition requisite time, the controller is further configured to continue presenting the presentation target information.

4. The driving assistance device according to claim 3, wherein:
in response to the presentation target information being presented and the given driving time being equal to or shorter than the sum of the safe driving requisite time and the remaining recognition requisite time, the controller is further configured to erase the presentation target information.

5. The driving assistance device according to claim 1, wherein:
the controller is further configured to calculate the degree of risk by using at least one of traveling environment information, road infrastructure information, or periphery monitoring information.

6. The driving assistance device according to claim 1, wherein:
in response to the presentation target information requiring an operation from the driver, the controller is further configured to calculate the recognition requisite time as a sum of a time required for the driver to perform the operation and an estimated time necessary for the driver to understand the presentation target information after the driver visually confirms the presentation target information.

7. The driving assistance device according to claim 1, wherein:
in response to the presentation target information requiring a changing of a screen, the controller is further configured to calculate the recognition requisite time as a sum of a time required to change the screen and an estimated time necessary for the driver to understand the presentation target information after the driver visually confirms the presentation target information.

8. A non-transitory tangible computer readable storage medium storing a driving assistance computer program product including instructions for executing a driving assistance program to be executed by a computer for controlling a control unit of a driving assistance device to perform:
calculating a recognition requisite time, the recognition requisite time being a time required for a driver to recognize presentation target information after the presentation target information is presented;
calculating a degree of risk, the degree of risk being a degree to which an obstacle detected by a vehicle periphery detection sensor endangers a safety of the driver;
calculating a given driving time according to the degree of risk, the given driving time being a time until contacting the obstacle;
calculating a safe driving requisite time, the safe driving requisite time being a time required for the driver to drive safely, according to the degree of risk; and
in response to the presentation target information not being presented and the given driving time being longer than a sum of the safe driving requisite time and the recognition requisite time, presenting the presentation target information, wherein the presentation target information does not include information regarding the obstacle detected by the vehicle periphery detection sensor.

9. The non-transitory tangible computer readable storage medium according to claim 8, wherein:
   in response to the presentation target information not being presented and the given driving time being equal to or shorter than the sum of the safe driving requisite time and the recognition requisite time, prohibiting presentation of the presentation target information.

10. The non-transitory tangible computer readable storage medium according to claim 8, further comprising instructions for implementing:
   calculating a used recognition time, the used recognition time being a time actually used by the driver to recognize the presentation target information;
   calculating a remaining recognition requisite time, the remaining recognition requisite time being a difference of the recognition requisite time and the used recognition time; and
   in response to the presentation target information being presented and the given driving time being longer than a sum of the safe driving requisite time and the remaining recognition requisite time, calculating a presented state of the presentation target information.

11. The non-transitory tangible computer readable storage medium according to claim 10, wherein:
   in response to the presentation target information being presented and the given driving time being equal to or shorter than the sum of the safe driving requisite time and the remaining recognition requisite time, erasing the presentation target information.

* * * * *